(12) United States Patent
McConville et al.

(10) Patent No.: US 9,163,555 B2
(45) Date of Patent: Oct. 20, 2015

(54) COMPRESSOR BYPASS TURBINE-GENERATOR

(71) Applicant: Ford Global Technologies, LLC, Dearborn, MI (US)

(72) Inventors: Gregory Patrick McConville, Ann Arbor, MI (US); Karen Elizabeth Maceroni, Casco, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 13/707,443

(22) Filed: Dec. 6, 2012

(65) Prior Publication Data

US 2014/0157774 A1    Jun. 12, 2014

(51) Int. Cl.
*F02B 33/44*    (2006.01)
*F02B 37/16*    (2006.01)

(52) U.S. Cl.
CPC ............. *F02B 37/164* (2013.01); *Y02T 10/144* (2013.01)

(58) Field of Classification Search
CPC ............................ F02B 37/164; Y02T 10/144
USPC ............................................ 60/611, 327, 459
See application file for complete search history.

(56) References Cited

U.S. PATENT DOCUMENTS

| | | | |
|---|---|---|---|
| 5,394,848 A | 3/1995 | Tsutsumi et al. | |
| 7,152,393 B2* | 12/2006 | Hergemoller et al. | 60/280 |
| 7,383,684 B2* | 6/2008 | Vuk | 60/606 |
| 7,487,639 B2* | 2/2009 | Hofstetter | 60/611 |
| 7,503,175 B2 | 3/2009 | Isogai | |
| 7,529,614 B1 | 5/2009 | Muller | |
| 7,859,127 B2* | 12/2010 | Tateoka | 290/52 |
| 2009/0045629 A1* | 2/2009 | Vuk | 290/52 |
| 2010/0281863 A1* | 11/2010 | Shiraishi | 60/605.1 |

FOREIGN PATENT DOCUMENTS

WO    2011156057 A2    12/2011

* cited by examiner

*Primary Examiner* — Thai Ba Trieu
*Assistant Examiner* — Paolo Isada
(74) *Attorney, Agent, or Firm* — Julia Voutyras; Alleman Hall McCoy Russell & Tuttle LLP (57) ABSTRACT

Embodiments for a turbine-generator position in a compressor bypass flow path are presented. In one example, a method for an engine having a compressor comprises generating energy via a turbine-generator positioned in a bypass flow path of the compressor. In this way, the energy of the recirculated intake air may be recovered by the turbine-generator.

17 Claims, 6 Drawing Sheets

COMPRESSOR BYPASS TURBINE-GENERATOR

FIELD

The present disclosure relates to an internal combustion engine.

BACKGROUND AND SUMMARY

Turbocharging an engine allows the engine to provide power similar to that of a larger displacement engine. Thus, turbocharging can extend the operating region of an engine. Turbochargers function by compressing intake air in a compressor via a turbine operated by exhaust gas flow. Under certain conditions, the flow rate and pressure ratio across the compressor can fluctuate to levels that may result in noise disturbances, and in more severe cases, performance issues and compressor degradation.

Such compressor surge may be mitigated by one or more compressor bypass valves (CBV) located in the intake. The CBVs may recirculate compressed air from the compressor outlet to the compressor inlet. However, the inventors herein have recognized that recirculation of compressed air may waste the energy utilized to the compress the air, leading to degraded fuel economy under some conditions.

Accordingly, a method is provided to address the loss of energy associated with the recirculation of compressed intake air. In one example, a method for an engine having a compressor comprises generating energy via a turbine-generator positioned in a bypass flow path of the compressor.

In this way, the energy of the recirculated intake air may be recovered by a turbine-generator positioned in the compressor bypass flow path. Flow of air through the turbine-generator may be controlled by a compressor bypass valve. Typically, the compressor bypass valve is controlled to recirculate compressed air in order to avoid surge. During conditions of low flow through the compressor bypass passage, the valve may be controlled to recirculate air through the turbine-generator before reaching the inlet of the compressor. The position of the valve may control the mass flow that is allowed to recirculate around the compressor. This allows a metered amount of air to recirculate, providing compressor operation at a more favorable point on the compressor map. During transient conditions when larger amounts of recirculated air are desired, such as when the intake throttle closes, the valve may be controlled to a position that allows air to bypass the turbine and flow from the high pressure to low pressure side of the compressor via a compressor bypass passage. The compressor bypass passage may be relatively large and/or allow unrestricted flow around the compressor. In doing so, compressor surge may be mitigated under most operating conditions while generating additional energy via the turbine-generator.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Compressor surge may occur when the pressure ratio across the compressor increases relative to the mass flow rate through the compressor. Compressor surge may result in noise disturbances, engine power fluctuations, and in some conditions, engine degradation. To control compressor surge, a compressor bypass valve may be opened to recirculate a portion of the compressed intake air to upstream of the compressor, thus increasing the flow through the compressor. A turbine may be positioned in the path of the compressor bypass flow. The turbine may be coupled to an energy conversion device such as a generator. In this way, when the compressor bypass valve is opened, the recirculated air may be passed through the turbine to generate energy in the energy conversion device.

Figure 1:
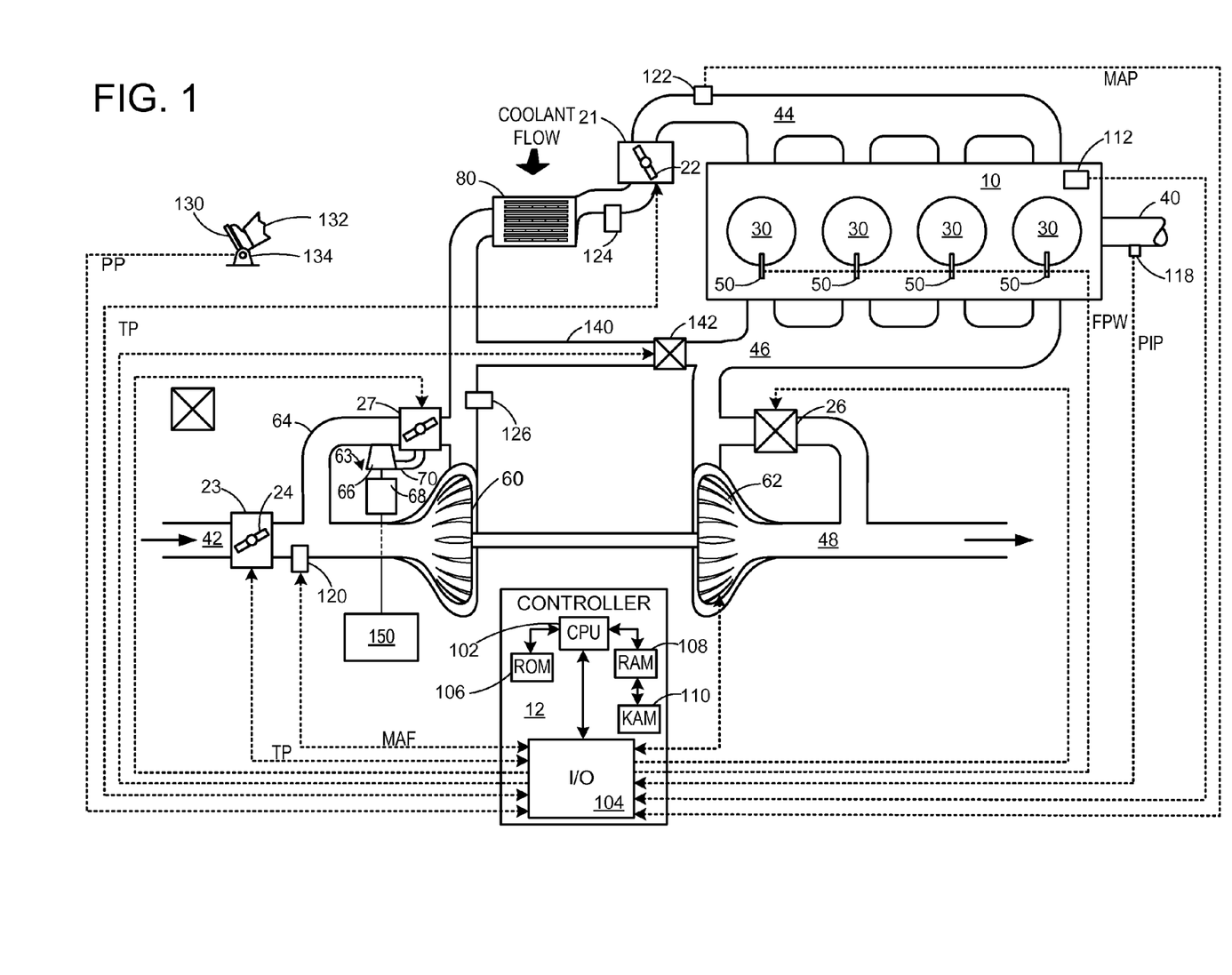
FIG. 1 shows a schematic diagram of an example engine including a turbine-generator controlled by a compressor bypass valve.

An engine system including a compressor, compressor bypass valve, and turbine-generator is illustrated in FIG. 1. The compressor bypass valve may be adjusted to multiple positions, illustrated in FIGS. 2A-3C. The engine system of FIG. 1 also includes a controller which may carry out the routine illustrated in FIG. 4 according to a map illustrated in FIG. 5. Various operating parameters observed during the execution of the routine of FIG. 4 are illustrated in FIG. 6.

First, FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42. For example, as depicted in FIG. 1, an additional throttle 23 having a throttle plate 24 is located upstream of compressor 60.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, a compressor bypass valve (CBV) 27 configured to divert intake air around compressor 60 may be positioned in a compressor bypass passage 64 around compressor 60. Wastegate 26 and/or CBV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. In the embodiment depicted in FIG. 1, CAC 80 is located along intake passage 42 between compressor 60 and intake manifold 44, and after the compressor bypass passage 64 splits from intake passage 42. This may provide for relatively cool compressed intake air to be routed to the engine, while warmer compressed intake air is recirculated back to the inlet of the compressor. The warmer compressed air may allow for greater expansion of the air across a turbine-generator 63 (described in more detail below) positioned in the compressor recirculation flow path. However, in other embodiments, the CAC 80 may be positioned in the intake passage 42 between compressor 60 and the intake manifold 44, but upstream of where compressor bypass passage 64 splits from intake passage 42. In this way, the compressed intake air may be cooled before being recirculated back to the compressor inlet, reducing excess compressor outlet temperatures.

The turbine-generator 63 includes a turbine 66 which drives an auxiliary generator 68. The auxiliary generator may provide charge to a battery of the engine as a supplement to charging by a mechanically driven primary generator and/or as a main source of charging, for example when the primary generator degrades or fails.

Turbine-generator 63 uses energy that is typically wasted by recirculating intake air around compressor 60. For example, the change in pressure across compressor 60 may be used to direct airflow through turbine 66. Turbine 66 drives auxiliary generator 68, which provides current to battery 150. In such a configuration, overall efficiency of the engine system may be improved, for example, as charging of battery 150 via a mechanically driven primary generator (not shown) may be reduced and charging via auxiliary generator 68 may be increased during some operating conditions. In other examples, using the energy generated from the turbine-generator in conjunction with the energy generated by the primary generator (e.g., alternator) for battery charging may decrease engine load and provide a fuel economy benefit.

As depicted, intake air flows through intake passage 42 and through compressor 60 before reaching the engine. A CBV position may be varied by controller 12 such that an amount of intake air recirculated around the compressor 60 is varied. Compressor bypass passage 64 directs intake air from a position downstream of and around compressor 60 to a position upstream of compressor 60. The intake air may be directed through compressor bypass passage 64 by a pressure difference across the CBV, for example. CBV 27 may be modulated to adjust the flow of compressed recirculated intake air through recirculation passage, as described below with reference to FIGS. 2A-2C. In some examples, CBV 27 may be an on/off valve which opens and closes compressor bypass passage 64. In other examples, CBV 27 may be a flow modulating valve which controls a variable amount of airflow through compressor bypass passage 64. CBV 27 may be a throttle valve, three-way ball valve, plunger or spool valve, a gate valve, a butterfly valve, or another suitable flow control device. Further, CBV 27 may be actuated by a solenoid, a pulse width modulated solenoid, a DC motor, a stepper motor, a vacuum diaphragm, or the like.

During some conditions, at least a portion of the airflow directed through compressor bypass passage 64 may pass through turbine 66. Turbine 66 spins auxiliary generator 68 with energy extracted from the airflow. Auxiliary generator 68 generates current which is supplied to battery 150. Battery 150 may provide power to various components of an electrical system of the vehicle in which engine 10 is disposed, such as lights, pumps, fans, fuel injection, ignition, air-conditioning, and the like. Battery 150 may be further charged by a primary generator which is mechanically driven by engine 10. While FIG. 1 illustrated turbine 66 coupled to a generator, other configurations are possible. For example, turbine 66 may be coupled to a different energy conversion device, such as an alternator.

CBV 27 may direct a portion, the entirety, or none of the airflow exiting compressor 60 through compressor bypass passage 64. For example, when CBV 27 is closed, all the airflow exiting compressor 60 may be directed to the engine. When open, at least a portion of the airflow exiting compressor 60 may be directed through compressor bypass passage 64.

CBV 27 may further control flow of air through turbine 66. As shown in FIG. 1, a turbine passage 70 may be coupled to compressor bypass passage 64. During conditions of low flow into compressor bypass passage 64, the air exiting compressor 60 may be routed through turbine passage 70 and turbine 66, generating electricity via generator 68 to be stored in battery 150. During conditions of high flow into compressor bypass passage 64, the air exiting compressor 60 may be routed through compressor bypass passage 64 without passing through turbine passage 70. To route air through turbine passage 70 during some conditions and block air from turbine passage 70 during other conditions, CBV 27 may be configured as a three-way valve. In a fully closed position, compressed intake air may be blocked from passing though compressor bypass passage 64, and may be routed to the engine. In a first open position, a portion of the compressed intake air may be routed through turbine passage 70. In a second open position, a portion of the compressed intake air may be routed through compressor bypass passage 64.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature sensor 124 at the outlet of the charge air cooler 80, and a boost pressure sensor 126. Boost pressure sensor 126 may be located upstream of CAC 80, as depicted, or may be located downstream of CAC 80, and may be a combined pressure/temperature sensor in some embodiments. Other sensors not depicted may also be present, such as a sensor for determining the intake air velocity at the inlet of the charge air cooler, and other sensors. In some examples, storage medium read-only memory 106 may be programmed with computer readable data representing instructions executable by processor 102 for performing the methods described below as well as other variants that are anticipated but not specifically listed.

While FIG. 1 depicts a single compressor, in some embodiments, two or more compressors may be present. For example, two compressors may operate in parallel. In such cases, only one of the compressors may have a compressor bypass flow path that includes a turbine-generator. However, in other embodiments, both compressors may include turbine-generators in their respective bypass flow paths.

Figure 2A:
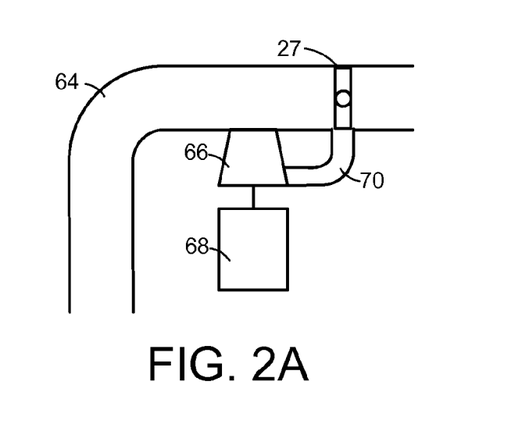
FIGS. 2A-2C show the compressor bypass valve of FIG. 1 in a plurality of operating positions.
Figure 2B:
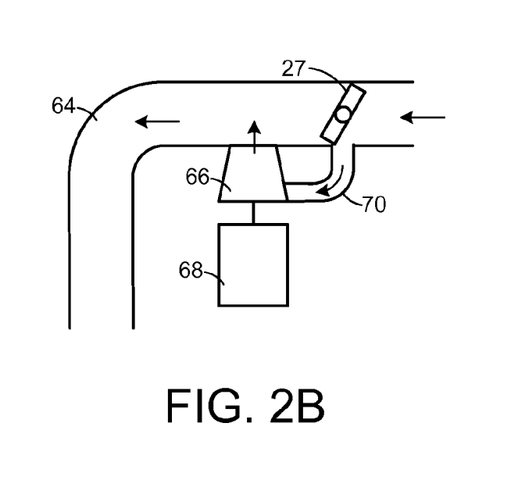
Figure 2C:
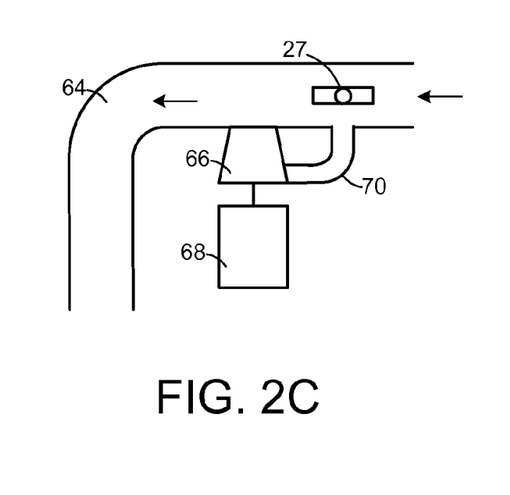

FIGS. 2A-2C illustrate the CBV 27 of FIG. 1 in a variety of operating positions. As depicted in FIGS. 1 and 2A-2C, CBV 27 may be a throttle-type valve. CBV may be positioned over an intersection of compressor bypass passage 64 and turbine passage 70. Thus, the position of CBV may dictate how much compressed intake air, if any, flows through the turbine 66. FIG. 2A illustrates CBV 27 in a fully closed position. In this position, substantially all compressed air is blocked from compressor bypass passage 64 and is instead routed to the engine. CBV 27 may be closed when the compressor is not operating in a surge region, for example, or when high amounts of boost are desired.

FIG. 2B illustrates CBV 27 in a first open position. In the first open position, the edge of the CBV may interface with a far edge of the turbine passage 70 where it intersects the compressor bypass passage 64. This opens up the turbine passage 70, allowing compressed air to recirculate from the compressor outlet to the compressor inlet via the turbine 66. However, the compressor bypass passage 64 may remain blocked, such that substantially all of the recirculated air is directed through the turbine.

FIG. 2C illustrates CBV 27 in a second open position. In the second open position, the CBV may be past the interface with the turbine passage 70. For example, as illustrated in FIG. 2C, the CBV may be fully open. As a result, the recirculated air may travel through the compressor bypass passage 64 on its way from the compressor outlet to the compressor inlet. Depending on the position of the CBV, substantially all the recirculated air may travel through the compressor bypass passage 64 without traveling through the turbine 66. However, some recirculated air may travel through the turbine 66 even when the CBV is in the second position.

While FIGS. 2A-2C illustrate the CBV 27 in a closed position or in a first or second open position, it is to be understood that the CBV may be adjusted to a variety of positions. For example, the CBV may be a continuously variable valve that is adjustable to a near-infinite number of restriction levels. As such, the CBV may be considered to be in the first open position when the valve is opened beyond the fully closed position illustrated in FIG. 2A, but yet not open past the position illustrated in FIG. 2B. The CBV may be in the second open position when open past the position illustrated in FIG. 2B. Further, the position of CBV may control the amount of air that is recirculated through the turbine. Thus, a metered amount of intake air may be routed through the turbine based on the position of the CBV.

Figure 3A:
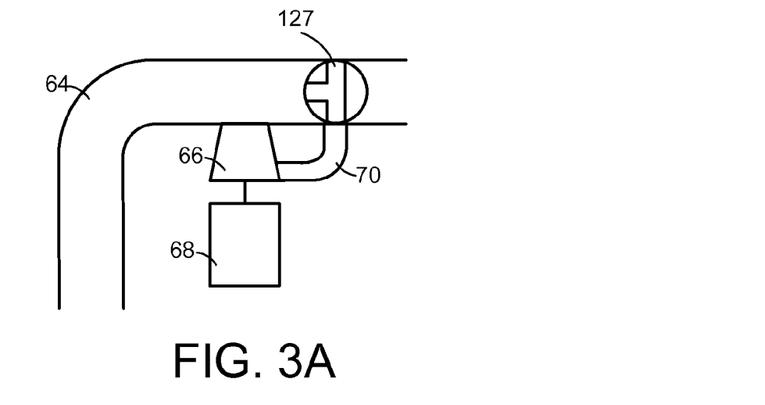
FIGS. 3A-3C show an alternate embodiment of the compressor bypass valve in a plurality of operating positions.
Figure 3B:
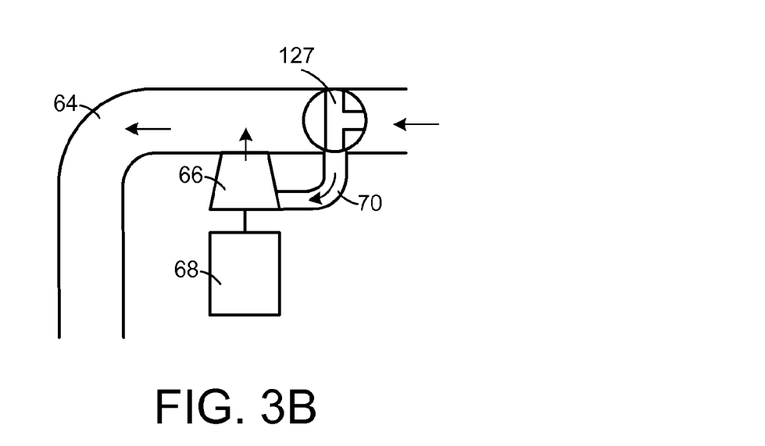
Figure 3C:
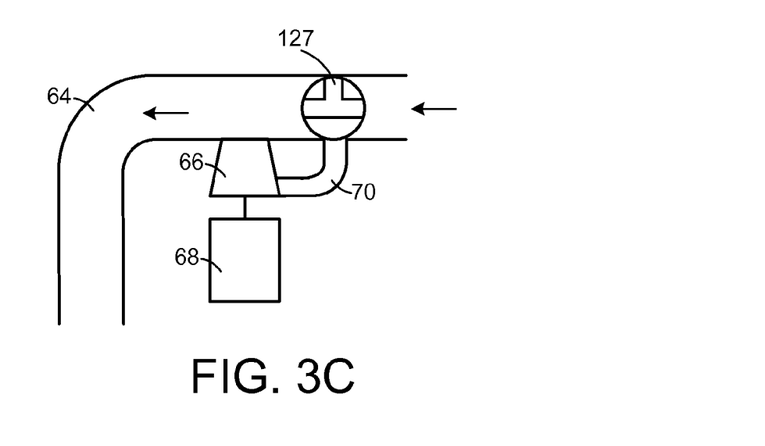
Figure 4:
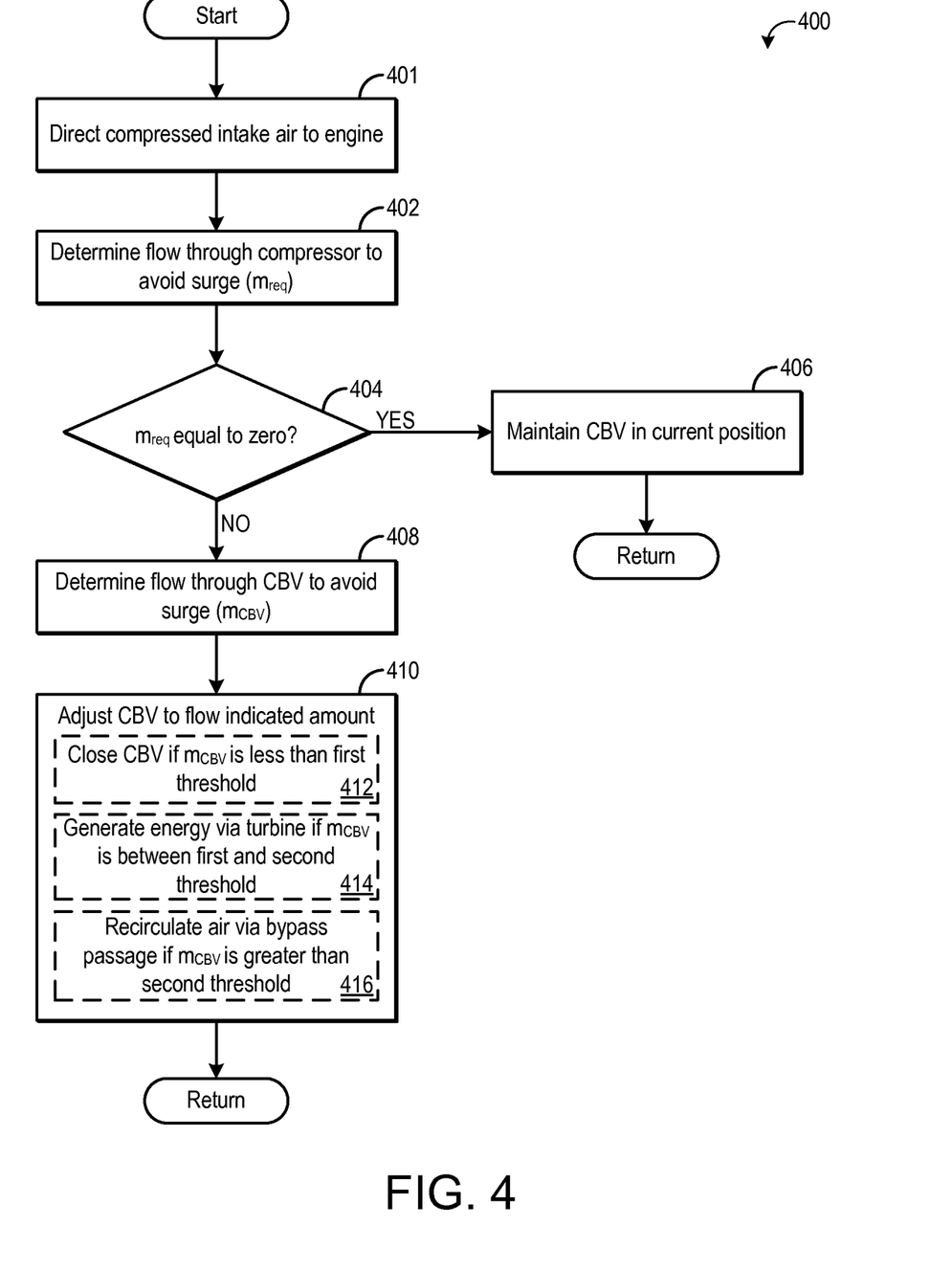
FIG. 4 is a flow chart illustrating a control routine for reducing compressor surge according to an embodiment of the present disclosure.

FIGS. 3A-3C illustrate another example of a compressor bypass valve. CBV 127 may be a three-way valve that is only adjustable to three positions. In the closed position, illustrated in FIG. 3A, the CBV 127 may block recirculation of the compressed intake air such that all compressed intake air is routed to the engine. In a first position, illustrated in FIG. 3B, substantially all the recirculated intake air may be routed through the turbine 66. In a second position, illustrated in FIG. 3C, substantially all the recirculated intake air may be routed through the compressor bypass passage 64, and the air may be blocked from reaching the turbine 66.

The systems illustrated herein provide for a system comprising a compressor bypass passage to recirculate compressed intake air from an outlet of a turbocharger compressor to an inlet of the turbocharger compressor; a turbine positioned in a flow path of the recirculated compressed intake air; and an energy conversion device coupled to the turbine.

The system may include a valve positioned in the compressor bypass passage. The turbine may be positioned in a turbine passage coupled to the compressor bypass passage. The system may further include a controller configured to adjust the valve to a first position to direct at least a portion of the recirculated compressed intake air through the turbine and to the inlet of the compressor.

The controller may be configured to adjust the valve to a second position to direct the recirculated compressed intake air through the compressor bypass passage and block the recirculated compressed intake air from reaching the turbine. The controller may be configured to close the valve to block recirculation of the compressed intake air and direct the compressed intake air to the engine. The controller may be configured to adjust the valve based on a pressure ratio and a mass flow rate of the compressor.

The turbine may be a first turbine, and the system may further comprise a second turbine positioned in an exhaust path of the engine and coupled to the compressor via a shaft. The energy conversion device may be coupled to a battery. In one example, the energy conversion device may be a generator.

FIG. 4 illustrates an example control routine 400 for adjusting a compressor bypass valve, such as CBV 27, in order to prevent surge across a compressor (e.g., compressor 60). Routine 400 may be carried out by controller 12. At 401, routine 400 directs compressed intake air to the engine. Depending on the current position of the CBV, all of the compressed intake air may be routed to the engine (when the valve is closed) or a portion of the compressed intake air may be routed to the engine (if the valve is open, a portion of the compressed intake air is recirculated back to the inlet of the compressor). At 402, a mass flow rate $\dot{m}_{req}$ through the compressor required to avoid surge is determined. The flow rate to avoid surge may be estimated based on a determined flow rate at the engine intake air throttle (such as throttle 21). The mass flow through the throttle, which may be determined by a sensor, such as sensor 122, may be used to determine the flow through the compressor under steady state conditions. The mass flow rate through the compressor to avoid surge, $\dot{m}_{req}$, may be determined based on the equation:

$$\dot{m}_{req} = \dot{m}_{SL} - \dot{m}_C$$

where $\dot{m}_C$ is the mass flow through the compressor and $\dot{m}_{SL}$ is the mass flow through the compressor at the surge line. The mass flow though the compressor at the surge line may be determined by a map stored in the controller, and may be based on the pressure ratio across the compressor.

Figure 5:
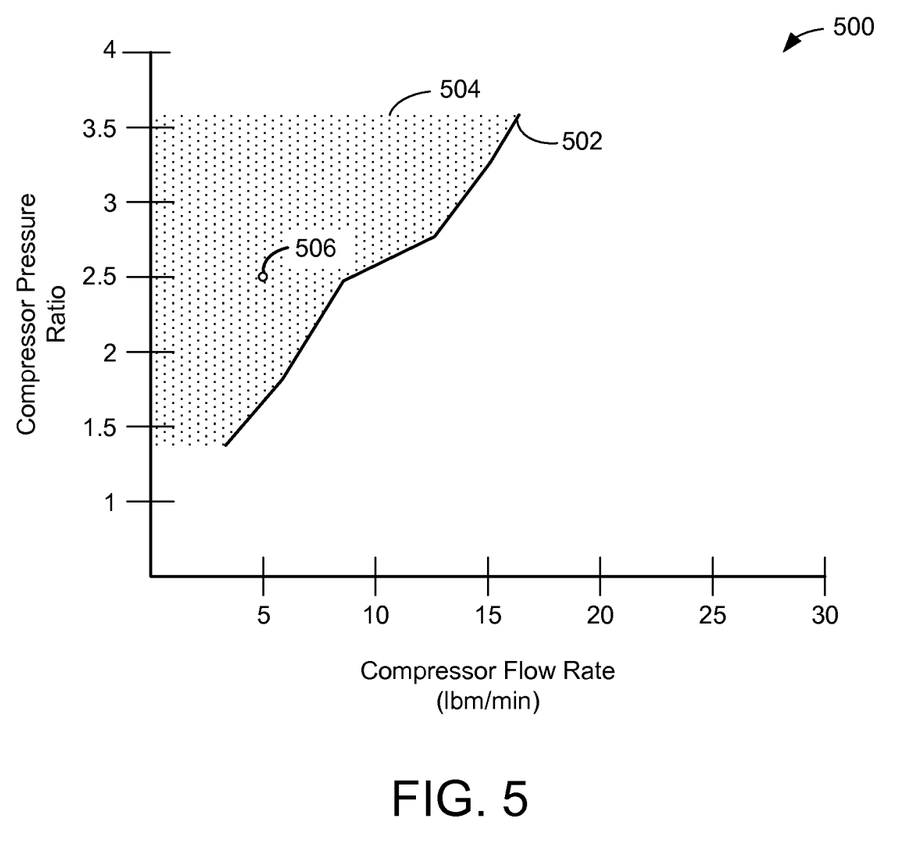
FIG. 5 is an example compressor flow map.
Figure 6:
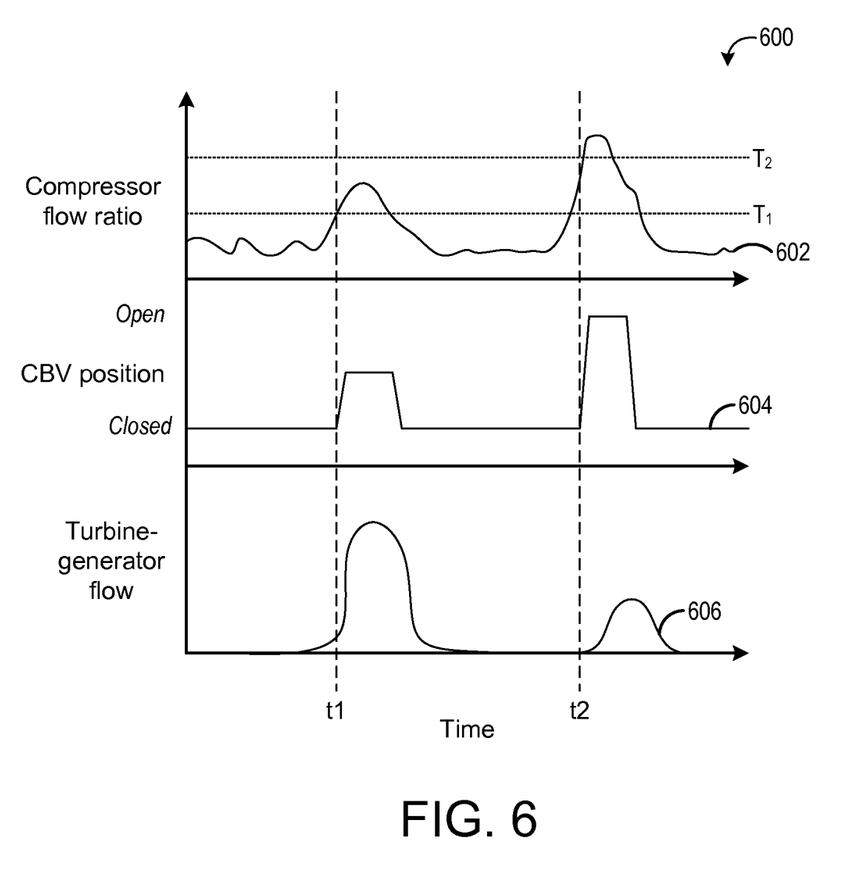
FIG. 6 is a diagram illustrating example operating parameters of interest.

An example map 500 is depicted in FIG. 5. Flow rate through the compressor is depicted on the x-axis while the pressure ratio of the compressor is depicted on the y-axis. An example surge line is indicated by line 502. The pressure-flow coordinates to the left of the surge line 502 are in the surge region 504, where conditions are of low enough flow and high enough pressure to cause compressor surge. While one surge line is depicted in FIG. 5, multiple surge lines may be utilized. For example, a soft surge line may be located to the right of surge line 502, which may be a referred to as a hard surge line. Pressure-flow coordinates between the soft surge line and hard surge line may not cause surge, but may be sufficiently close to the hard surge line that a change in operating parameters (e.g., tip-in event) may cause compressor surge, and thus various operating parameters (such as adjustment to the CBV) may be adjusted when the compressor is operating in this region. Further, in some examples, the location of the one or more surge lines may be dependent on operating parameters. For example, the soft surge line may be located relatively close to the hard surge line at lower pressure ratios, but located substantially to the right of the hard surge line at higher pressure ratios.

In one example, at a pressure ratio of 2.5 and flow rate of 5 lbm/min, indicated by dot 506, surge may occur. To avoid surge, the flow rate through the compressor may be increased to the reach the surge line, for example it may be increased by approximately 4 lbm/min to 9 lbm/min, to avoid surge. To increase the flow through the compressor, the CBV may be opened, as explained below.

Returning to 402 of FIG. 4, if the flow rate across the throttle is less than the flow rate at the surge line, the compressor is operating in a surge region. To reduce surge, the flow rate through the compressor may be increased by opening the CBV. Further, if the compressor is operating near a surge line and is predicted to enter the surge region in a future operating condition (such as a transient tip-out), the flow rate through the compressor may be proactively increased to avoid a future surge event.

At 404, it is determined if $\dot{m}_{req}$ is equal to zero. If $\dot{m}_{req}$ is equal to zero, no adjustments to the CBV position are needed to avoid surge, and thus control routine 400 proceeds to 406 to maintain the CBV in its current position, and routine 400 returns.

If $\dot{m}_{req}$ is not equal to zero, routine 400 proceeds to 408 to determine the flow through the compressor that is needed to avoid surge ($\dot{m}_{CBV}$), and based on this flow amount, determine the position of the CBV to provide the required flow for avoiding surge. The position of the CBV, and thus the opening amount or orifice cross-section, A, may be determined by a standard orifice flow equation:

$$A = \frac{\dot{m}_{CBV}}{C\sqrt{2\rho(P_1 - P_2)}}$$

where $\dot{m}_{CBV}$ is the flow through the CBV to avoid surge (which may be equal to $\dot{m}_{req}$ in some embodiments), C=coefficient of orifice flow constant, A=cross-sectional area of the orifice, ρ=fluid density, $P_1$=pressure upstream of the CBV, and $P_2$=pressure downstream of the CBV.

At 410, the CBV is adjusted to provide the indicated flow amount. In some embodiments, this may include increasing the opening of the CBV, while in other embodiments it may include decreasing the opening of the CBV. If $\dot{m}_{CBV}$ is less than a first threshold, for example if $\dot{m}_{CBV}$ is equal to zero due to the CBV being previously open to reduce surge, but mass flow through the compressor is changing and the compressor is no longer operating near the surge line, the CBV may be closed, as indicated at 412. When the CBV is closed, substantially all of the compressed intake air is directed to the engine, and is blocked from being recirculated around the compressor.

If $\dot{m}_{CBV}$ is greater than the first threshold but less than a second threshold, energy may be generated via compressor bypass flow through a turbine-generator, as indicated at 414. As explained previously, during lower compressor bypass flow conditions, such as when the compressor is operating near a surge line, the compressor bypass flow may be routed through the turbine-generator. The energy generated by the turbine-generator may be stored in a vehicle battery, for example, or used to power one or more of the vehicle electrical components. To flow at least a portion of the compressed intake air through the turbine, the CBV may be adjusted to a first position. The first position may open a turbine passage coupled to the compressor bypass passage, allowing the compressed air to flow through the turbine. The first position may be the position of the CBV illustrated in FIG. 2B or 3B. The first position may be a discrete position of the CBV, for example if the CBV is a three-way valve as illustrated in FIG. 3B. However, in other examples, the first position may include a range of positions of the CBV valve in which intake air is allowed to flow through the turbine, as illustrated in FIG. 2B.

At higher compressor bypass flow rates, the flow through the turbine may increase the pressure of the air in the compressor bypass passage, and thus may impede effective surge mitigation. Thus, as indicated at 416, if $\dot{m}_{CBV}$ is greater than a second threshold, the compressed intake air may be recirculated to upstream of the compressor via the compressor bypass passage without passing through the turbine. The CBV may be adjusted to a second position that couples the outlet of the compressor to the inlet of the compressor via the compressor bypass passage. This position may still allow a small amount of flow through the turbine (as illustrated in FIG. 2C, for example), or may substantially block flow through the turbine (as illustrated in FIG. 3C). The second position may a discrete position that directs air through the bypass passage but not the turbine, or it may include a range of positions.

The first and second thresholds may be suitable thresholds based on the air flow required to reduce compressor surge. The first threshold may be zero or other suitable low flow through the compressor bypass passage. The second threshold may be a larger flow rate than the first flow rate, and may be based on the pressure ratio across the turbine of the turbine-generator as well as where the compressor is operating on the surge map. For example, if the pressure drop across the turbine is large enough to maintain or push the compressor to the surge region, then the CBV may be adjusted so that the compressed air travels through the compressor bypass passage rather than the turbine. During a transient event, such as during a transient throttle closure, a high amount of compressor recirculation may be indicated to avoid surge. Thus, the CBV may be adjusted to flow compressed air through the bypass passage rather than the turbine when the throttle closes.

FIG. 6 is a diagram 600 illustrating example operating parameters that may occur during the execution of routine 400, for example. Diagram 600 illustrates example compressor pressure ratio to flow rate ratio, compressor bypass valve position, and turbine-generator flow over a variety of operating conditions. For each illustrated operating parameter, time is illustrated on the horizontal axis and values of each respective operating parameter are illustrated on the vertical axis.

Curve 602 illustrates the ratio of the compressor pressure ratio to mass flow rate, referred to in FIG. 6 as the compressor flow ratio. The compressor flow ratio as illustrated on the vertical axis starts at zero and increases towards a maximum ratio. Two threshold levels of the flow ratio are illustrated, a first threshold ($T_1$) and a second threshold ($T_2$). Below the first threshold, the ratio is below a surge line of the compressor. For example, referring back to the compressor flow map illustrated in FIG. 5, approximately all points on the flow map below a pressure ratio to mass flow ratio of 1:4 are not within the illustrated surge region.

When operating outside the surge region, surge mitigation is not needed, and thus the compressor bypass valve, illustrated by curve 604, is closed. However, at time t1, the compressor pressure ratio increases relative to the mass flow rate, and the flow ratio increases above the first threshold. This may occur due to a transient engine operating event, such as an accelerator tip-in or tip-out, for example. When the flow ratio is above the first threshold, the compressor may be operating in the surge region, and thus the compressor bypass valve may be opened to reduce or avoid surge.

When the flow ratio is above the first threshold, but below the second threshold as illustrated at time t1 of curve 602, a portion of the compressed intake air may be recirculated back to the inlet of the compressor via a turbine-generator. To accomplish this, the compressor bypass valve may be opened at time t1 (and illustrated in curve 604) to a first position that allows the recirculating air to flow through the turbine-generator before reaching the compressor inlet. As a result, flow through the turbine increases, as illustrated by curve 606. The flow through the turbine drives energy generation in the generator coupled to the turbine, which may be stored in a battery, for example.

After the compressor bypass valve opens to the first position, the compressor flow ratio returns to below the first threshold. As a result, the valve closes and flow through the turbine-generator is blocked. However, at time t2, the throttle may close or another large transient event may occur, causing a large increase in the compressor flow ratio. As such, after time t2, the compressor flow ratio is above the second threshold. At this level, larger amounts of recirculation may be needed to reduce or avoid surge. The compressor bypass valve is thus opened to a second position that recirculates a portion of the compressed intake air back to the compressor inlet. The second position may recirculate the air without substantially passing through the turbine-generator. However, a small amount of air may still pass through the generator, causing a small increase in the flow through the turbine-generator, as illustrated in curve 606.

Thus, in one example, a method for an engine having a compressor comprises generating energy via a turbine-generator positioned in a bypass flow path of the compressor. Generating energy via the turbine-generator may further comprise directing at least a portion of recirculated compressed intake air through the turbine generator.

The method may include adjusting a compressor bypass valve to recirculate compressed intake air from an outlet of the compressor to an inlet of the compressor. Directing at least a portion of recirculated compressed intake air through the turbine-generator may further comprise adjusting the compressor bypass valve to a first position. The first position may be a discrete position or it may be a range of positions. In the first position, the recirculated compressed intake air may be routed through the turbine-generator.

The method may include adjusting the compressor bypass valve to a second position to recirculate compressed intake air from the outlet of the compressor to the inlet of the compressor without directing the compressed intake air through the turbine-generator. The second position may be a discrete position or it may be a range of positions. In the second position, the recirculated compressed intake air may be routed through the compressor bypass passage and not the turbine-generator. The method may further include closing the compressor bypass valve to block recirculation of the compressed intake air.

In another example, a method for an engine having a compressor comprises directing intake air through a compressor and to the engine; and during select conditions, recirculating at least a portion of the intake air from downstream of the compressor to upstream of the compressor via a turbine-generator positioned in a compressor bypass flow path.

Recirculating at least a portion of the intake air from downstream of the compressor to upstream of the compressor via a turbine-generator may further comprise opening a compressor bypass valve to a first position. The select conditions comprise a ratio of a compressor pressure ratio to mass air flow being above a first threshold and below a second threshold.

The method may include when the ratio is above the second threshold, opening the compressor bypass valve to a second position to recirculate at least a portion of the intake air from downstream of the compressor to upstream of the compressor without passing through the turbine-generator. The method may include when the ratio is below the first threshold, closing the compressor bypass valve to direct the intake air from downstream of the compressor to the engine.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling air of an engine having a compressor, comprising:
   generating energy by directing at least a portion of compressed intake air through a turbine of a turbine-generator by closing a compressor bypass valve to block recirculation of the compressed intake air,
   wherein the compressor bypass valve arranged in a compressor bypass passage is in a first position, the turbine positioned in a turbine passage, and the turbine passage coupled to the compressor bypass passage;
   recirculating at least a portion of compressed intake air from an outlet of the compressor to an inlet of the compressor without passing through the turbine of the turbine-generator by opening the compressor bypass valve to a second position.

2. The method of claim 1, wherein the compressor bypass valve is positioned over an intersection of the compressor bypass passage and the turbine passage.

3. The method of claim 1, further comprising adjusting the compressor bypass valve based on a ratio of a compressor pressure ratio to a mass air flow.

4. A method of controlling air of an engine having a compressor, comprising:
   directing intake air through a compressor and to the engine;
   when a ratio of a compressor pressure ratio to a mass air flow is above a first threshold and below a second threshold, recirculating at least a portion of the intake air from downstream of the compressor to upstream of the compressor via a turbine of a turbine-generator, by closing the compressor bypass valve, wherein the turbine is positioned in a turbine passage coupled to a compressor bypass passage; and
   when the ratio is above the second threshold, recirculating at least a portion of the intake air from downstream of the compressor to upstream of the compressor without passing through the turbine of the turbine-generator by opening the compressor bypass valve.

5. The method of claim 4, wherein recirculating at least a portion of the intake air from downstream of the compressor to upstream of the compressor without passing through the turbine-generator further comprises opening the compressor bypass valve to a second position in which the compressor bypass valve is fully open.

6. A system comprising:
   a compressor bypass passage configured to recirculate compressed intake air from an outlet of a turbocharger compressor to an inlet of the turbocharger compressor;
   a turbine positioned in a turbine passage coupled to the compressor bypass passage;
   a compressor bypass valve positioned over an intersection of the compressor bypass passage and the turbine passage; and
   an energy conversion device coupled to the turbine.

7. The system of claim 6, further comprising a controller configured to adjust the valve to a first position to direct at least a portion of the recirculated compressed intake air through the turbine passage and to the inlet of the compressor.

8. The system of claim 7, wherein the controller is configured to adjust the valve to a second position to direct the recirculated compressed intake air through the compressor bypass passage and block at least a portion of the recirculated compressed intake air from reaching the turbine.

9. The system of claim 8, wherein the valve is a throttle-type vavle.

10. The system of claim 8, wherein the valve is a three-way vavle.

11. The system of claim 10, wherein in the first position of the valve, all of the recirculated compressed intake air is routed through the turbine, and wherein in the second position of the valve, all of the recirculated compressed intake air is routed through the compressor bypass passage and blocked from reaching the turbine.

12. The system of claim 9, wherein in the first position of the valve, an edge of the valve interfaces with a far edge of the turbine passage where it intersects the compressor bypass passage.

13. The system of claim 12, wherein in the second position of the valve, the edge of the valve is positioned past the interface with the turbine passage and the valve is fully open.

14. The system of claim 7, wherein the controller is configured to close the valve to block recirculation of the compressed intake air and direct the compressed intake air to the engine.

15. The system of claim 7, wherein the controller is configured to adjust the valve based on a pressure ratio and a mass flow rate of the compressor.

16. The system of claim 6, wherein the turbine is a first turbine, and further comprising a second turbine positioned in an exhaust path of the engine and coupled to the compressor via a shaft.

17. The system of claim 6, wherein the energy conversion device is coupled to a battery.

* * * * *